3,242,116
METHOD OF MAKING AN EPOXY GROUT COMPOSITION
Ralph S. Becker and Roy Soraiz, Houston, Tex., assignors to Advance Research Co., Houston, Tex., a partnership
No Drawing. Filed July 2, 1963, Ser. No. 292,476
3 Claims. (Cl. 260—29.2)

This invention relates to grouts for ceramic tile and masonry products, and more particularly to epoxy resin based grouting compositions and grouts which permit coexistence of an epoxy resin and a resin catalyst in one container without interaction therebetween.

Generally grouting materials used to grout joints between ceramic tile and masonry products either contain a cement type material or an epoxy resin material as the principal adhesive component. Epoxy resin based grouts are preferred for many purposes because they are resistant to acids, alkalis, vegetable oils, and solvents.

However, all prior existing epoxy based grouts require that at least two materials be stored in separate containers and intermixed only immediately before application. To be specific, the resin catalyst used to activate the epoxy resin must be maintained in a separate container until immediately before application as prior mixing would cause the mixed material to cure or "set-up."

The necessity to intermix immediately before application raises several problems, one of which is that the relative percentage by weight of the components in the material once mixed is important and tile and building contractors who mix and apply the grout usually do not have the equipment necessary to accurately measure and mix the epoxy resin and resin catalyst. Contractors usually mix the components on a volume basis which results in a finished product having varying properties because the same volume of a component does not always have the same weight due to compacting and other factors.

If the epoxy resin and resin catalyst are not properly proportioned and mixed the resulting grout will cure either too slowly, too rapidly, at some points and not at others, or fail to cure altogether.

Further, once the material is mixed it cannot be separated and if more material is mixed than is needed there will be a waste of material.

Another of the important disadvantages of the two container epoxy grout system is that the resin catalyst, which in most instances is an amine, is very irritable to the mucous membranes as well as injurious to the skin. Therefore, the individual who mixes the resin and resin catalyst before application will, unless safety measures are observed, and they seldom are, be exposed to the fumes from the resin catalyst and may possibly spill the catalyst and do injury to the skin.

Accordingly, it is an object of this invention to provide an epoxy based resin grouting composition which can be accurately intermixed and stored for prolonged periods of time without interaction of the resin and resin catalyst.

Another object of this invention is to provide a resin based grouting composition which no measuring or mixing other than that which can be conveniently and accurately performed at the situs of application.

Yet another object is to provide an epoxy based grouting composition which exhibits more uniform properties upon installation.

Another object is to provide a grouting composition which reduces the time needed for application, and which permits application without waste.

Still another object is to provide an epoxy based grouting composition which eliminates the possibility of injury to the person dealing with the grout due to the vapors of the catalyst or the contacting of the catalyst with the skin.

Another object is to provide a grouting composition containing an epoxy resin and a resin catalyst which can be transmitted in one container thus eliminating many of the problems encountered with the two can epoxy grouting composition.

Although specific terms are used in the following description for clarity, and to aid in the disclosure of several embodiments of the invention, they are not intended, nor should they be construed, to limit the scope or define the invention.

The objects of the invention are accomplished in accordance with the present invention by mixing, in an unhydrated state, an epoxy resin capable of curing to a hard, tough, and durable state and resin catalyst impregnated capsules. The purpose of the capsules being to isolate the resin catalyst from the resin until the application of water or heat to the capsules at which time the catalyst will be released for interaction with the resin.

With the advent of a molecular sieve or capsule capable of containing an isolated resin catalyst it became possible to provide a resin catalyst and resin mixture which could exist for extended periods of time without undesirable interaction. The molecular sieves or capsules absorb the resin catalyst and effectively isolate the catalyst from the resin until application of heat or water.

The present invention utilized such a system to provide a novel grouting composition to which heat or water can be added to form a grout for use with masonry and tile products. Because the present grouting composition can be intermixed for extended periods of time before application, it is possible to utilize equipment to precisely weigh and mix the components which were not ordinarily available when it was necessary to intermix the components immediately before application. Because the grouting composition can be precisely weighed and mixed, the finished grouting composition exhibits more uniform and desirable curing characteristics upon use.

The grouting composition to which water or heat can be added to form a grout comprises essentially two components, namely, epoxy resin and resin catalyst loaded capsules. As the resin catalyst is released from the capsules while in solution with the epoxy resin, there is no danger of fumes from the catalyst harming the mucous membranes of the individual applying the grout, nor is there possibility of harm to the skin due to contact with the catalyst because there is no need to mix catalyst from one container with resin from another.

To improve the grouting composition from an economic and quality standpoint, various components may be added to the basic two components. A filler or fillers which may conveniently be calcium carbonate, asbestos, perlite, vermiculite, calcium chloride, sand, diatomateous earth, silica sand, or other such suitable material, or any combination of the above mentioned materials, comprising from about 1% to 50% by weight of the finished mixture can be added to improve ease of application or workability of the composition.

To give the finished grout a pleasing appearance, it is often desirable to add a coloring pigment which may conveniently be titanium dioxide or other suitable material.

It is also desirable to add a surface active agent, viz, surfactant, to aid in cleaning of the grout after application, and to further add an aromatic solvent for reducing the viscosity of the finished mixture.

Almost any epoxy resin capable of curing to a hard tough durable solid can be used, but the preferred resin is diglycidyl ether of bisphenol A epoxy resin which is commercially marketed under the trademark ERL–2774. Many types of resin catalyst are available which will catalyze the cure of an epoxy resin among which are amides, amines, and thiokol catalysts. However, because of the present expense in absorbing or impregnating some types of resin catalyst molecules within a capsule, the present economically feasible resin catalyst capsules available contain amine catalyst.

The preferred catalyst is diethylene triamine impregnated or absorbed in zeolite sieves or capsules by the process described in U.S. Patent application, Serial No. 400,389, filed December 24, 1953, now U.S. Patent 2,882,-244. The diethylene triamine impregnated sieves are commercially available under the trademark CW–X 144E and contain by weight about 20% diethylene triamine.

To achieve a thoroughly mixed grouting composition it is desirable to separately intermix in a ball mill a pigment dispersion comprising a pigment, surfactant, aromatic solvent, and a small amount of silicone before the resulting pigment dispersion is added to the resin, resin catalyst capsules, and filler or fillers to form a finished grouting composition. Water or heat, as the case may be, may be added to the finished grouting composition to form a grout.

An example of one pigment dispersion that can conveniently be used is that of a titanium dioxide dispersion:

Ingredients: Percent by weight
TiO₂ (rutile grade) _____ 60
Dimethyl silicone fluid having a specific gravity of .968 at 25° C. and commercially identified by the trademark SF 100 _____ 5
Aromatic solvent commercially identified by trademark PC 100 with the following physical properties—
    API gravity at 60° F. _____ 29.5
    Specific gravity at 60° F. _____ .8789
    Initial boiling point, ° C. _____ 322      5
    50% distillation, ° C. _____ 329
    Dry end point, ° C. _____ 344
Surfactant such as a trimethyl nonyl ether of polyethylene glycol with trace amounts of ethylene oxide _____ 30

*Example I*

Ingredients: Percent by weight
Epoxy resin (ERL–2774) _____ 36.1
Resin catalyst capsules (CW-X144E) _____ 19.0
Titanium dioxide dispersion compounded as described above _____ 28.9
Calcium carbonate (dry ground) _____ 16.0

This material showed excellent stain resistance and hardness qualities within twenty-four hours after application of approximately 3% water, and is very washable with a soap and water solution during the initial curing stage.

*Example II*

In some applications it is necessary to use a grout exhibiting greater viscosity than those illustrated above because tile is applied to a vertical surface or because the joints between the tile are about one-half inch wide or greater and a more viscous grout is needed, as in the case of quarry tile applications. For such an application a grouting composition comprising:

Ingredients: Percent by weight
Epoxy resin (ERL–2774) _____ 42.98
Resin Catalyst capsules (CW-X144E) _____ 22.62
Titanium dioxide dispersion compounded as described above _____ 34.40 is added immediately before application to a silica sand containing about 1.0–1.5% water in the ratio of about one part grouting composition to about two to three parts silica sand. The silica sand particle size is preferably between —80/+120 U.S. Standard screen size, and while silica sand is a preferred filler, any type coarse aggregate such as quartz, or gravel could be used. The water contained in the silica sand will release the resin catalyst from the capsules and effect curing of the grout.

With grouting compositions compounded by use of resin catalyst impregnated capsules capable of releasing the resin catalyst upon the addition of water, it is necessary that the constituents chosen for the mixture be very anhydrous, and that the mixture once compounded be maintained in a dehydrated environment until it is to be used.

As mentioned before, a grout can be formed by mixing the grouting composition with water. With the compositions illustrated in the examples above, all of which employ resin catalyst impregnated capsules which release the resin catalyst upon the addition of water, the preferred amount of water to be added to the grouting composition is between 1% and 3% by weight of the grouting composition. The amount of water added is important and excess water may cause slow curing and weak grouts, and for this reason it is better to use a relatively smaller amount of water than an excess amount.

This invention may be embodied in other specific terms without departing from the spirit or essential characteristics thereof. The illustrated examples of one embodiment of the invention are for illustrative purposes only, and are not to be construed to be restrictive of the invention, the scope of which is indicated in the following claims.

What is claimed is:
1. The method of manufacturing a grouting composition capable of being stored for an extended period and capable of being dressed during the initial curing period by soap and water solution, which method comprises:
admixing the following constituents in approximately the indicated percentage by weight to obtain a titanium dioxide dispersion:

Percent
TiO₂ (rutile grade) _____ 60
Dimethyl Silicone fluid _____ 5
PC 100 aromatic solvent _____ 5
A trimethyl nonyl ether of polyethylene glycol with trace amounts of ethylene oxide ____ 30 admixing the above titanium dioxide dispersion with the following constituents in approximately the indicated percentage by weight:

Diglycidyl ether of bisphenol A epoxy resin __ 36
Zeolite sieves containing about 20% diethylene triamine _____ 19
Calcium carbonate (dry ground) _____ 16
Titanium dioxide dispersion (compounded as above) _____ 29

2. The method of claim 1 containing the additional step of:
admixing water in an amount from 1% to 3% by weight of the admixture of claim 1.
3. The method of manufacturing a grout comprising:
admixing a composition consisting of the following constituents in approximately the indicated percentages by weight to obtain a titanium dioxide dispersion:

Percent
TiO₂ (rutile grade) _____ 60
Dimethyl silicone fluid _____ 5
PC 100 aromatic solvent _____ 5
A trimethyl nonyl ether of polyethylene glycol with trace amounts of ethylene oxide ____ 30 admixing the above titanium dioxide dispersion with the following constituents in approximately the indicated percentage by weight:

Percent
Diglycidyl ether of bisphenol A epoxy resin __ 43
Zeolite sieves containing about 20% diethylene triamine _____ 23
Titanium dioxide dispersion _____ 34 admixing with the admixture described immediately above a silica sand containing from 1.0–1.5% water in the ratio of about 1 part admixture to about two to three parts sand.

References Cited by the Examiner

UNITED STATES PATENTS 2,868,767  1/1959  Cyba et al. _____ 260—37
3,018,264  1/1962  Colclough _____ 260—37

OTHER REFERENCES

Epoxy Trowling Compounds—New Application Techniques, SPE Journal, March 1961, pp. 252–254.

Linde Bulletin, "Linde Chemical-Load, Molecular Sieves as Patent Epoxy Hardeners and Catalysts," 6 pp.

MURRAY TILLMAN, *Primary Examiners*.